United States Patent [19]

Shibata

[11] Patent Number: 5,287,428
[45] Date of Patent: Feb. 15, 1994

[54] OPTICAL FIBER CABLE DISTRIBUTION APPARATUS

[75] Inventor: Mitsuhiro Shibata, Kawasaki, Japan

[73] Assignee: Fujitsu Limited, Kawasaki, Japan

[21] Appl. No.: 961,308

[22] Filed: Oct. 15, 1992

[30] Foreign Application Priority Data

Oct. 16, 1991 [JP] Japan .................... 3-267586

[51] Int. Cl.⁵ .............................................. G02B 6/36
[52] U.S. Cl. ................................................... 385/135
[58] Field of Search ...................... 385/135, 134, 53; 211/26

[56] References Cited

FOREIGN PATENT DOCUMENTS

2181270 4/1987 United Kingdom ............. 385/135
2199419 7/1988 United Kingdom ............. 385/135

*Primary Examiner*—Georgia Y. Epps
*Assistant Examiner*—John Ngo
*Attorney, Agent, or Firm*—Armstrong, Westerman, Hattori, McLeland & Naughton

[57] ABSTRACT

A compact optical fiber cable distribution apparatus is provided, that does not require a larger installation floor space and is easily adaptable for increasing and changing of a system. The apparatus comprises a plurality of DF modules (3) accommodated in a shelf (2) in a vertical position and parallel to each other, a fiber tray (5) arranged horizontally directly beneath or above the shelf (2), for the preparation for introducing first optical fiber cables (4) coming from a subscriber circuit and second optical fiber cables (4) connected with a switch board into the DF modules (3). A front section (A) of the fiber tray (5) is used as a guiding path for the first optical fiber cables (4), a rear section (C) is used as a guiding path for the second optical fiber cables (4') and a middle section (B) is used for accommodating the first and second optical fiber cables (4, 4') prior to introduction to the DF module (3). The shelf (2) and fiber tray (5) are combined with each other to form a unit.

7 Claims, 9 Drawing Sheets

OPTICAL FIBER CABLE DISTRIBUTION APPARATUS

BACKGROUND OF THE INVENTION

1. Field of the Invention

The present invention relates to a distribution apparatus for optical fiber cables, installed between a switch board and subscriber circuits, or between each of the communication equipments, for carrying out a total management of a fiber optic communication system, such as selecting, switching, classifying, or testing of the fiber optic circuits.

2. Description of the Related Arts

Recently, various digitalized communication systems, such as telephone systems, data communication systems, or image transmission systems, have increased the range of their services through a network. The new services are put into practical use in association with the spread of digital switch apparatuses or an optical fiber cable network into the subscriber area.

Accordingly, there is a demand for the mass introduction of a distribution apparatus for fiber optics in the subscriber area. The conventional fiber optic distribution apparatus, however, requires a wider floor area for installation thereof, because excess length management space and splice accommodation space are horizontally formed on a shelf, thereby creating a serious drawback because communication facilities other than optical fiber distribution apparatuses have recently been miniaturized. Thus, further miniaturization and dense mounting are desired in this technical field.

Further, in the conventional optical fiber cable distribution apparatus, initial installation cost is expensive, thereby creating a serious financial burden for an enterpriser. In addition, adaptation of the distribution apparatus is difficult when the subscriber circuits are increased, and operation and maintenance thereof are troublesome.

SUMMARY OF THE INVENTION

Accordingly, it is an object of the present invention to solve the above drawbacks of the prior art, and provide a compact optical fiber distribution apparatus that does not require a larger installation space and permits the easier operation and maintenance.

This object is achieved by an optical fiber cable distribution apparatus, according to the present invention, comprising a plurality of DF modules accommodated on a shelf in a vertical position and parallel to each other, a fiber tray arranged horizontally directly beneath or above the shelf for the preparation of introducing first optical fiber cables coming from outside such as a subscriber circuit and second optical fiber cables connected with equipment such as a switch board, into the DF modules; a front section of the fiber tray being used as a guiding path for the first optical fiber cables; a rear section of the fiber tray being used as a guiding path for the second optical fiber cables; and a middle section between the front and rear areas being used as an excess length accommodation space for the first and second optical fiber cables to be introduced into the respective DF modules, said shelf and fiber tray being combined with each other to form a unit.

Preferably, the shelf comprises a box-like basic structure formed by a pair of side plates and four beams connecting the side plates; rail supports extending along and fixed to the respective beams; and rail members arranged at a regular pitch while bridging the front beam with the rear beam, along each of which rail member the DF module is detachably inserted into the shelf.

Favorably, the fiber tray is a shallow U-shaped cross sectional duct having front and rear walls bending upright from a bottom wall; the bottom wall being divided into the front section, the middle section and the rear section by two partitions extending parallel to the front and rear walls.

Preferably, the DF module comprises a housing in a flat box-like housing having an installation wall; a series of fiber guides each having a guiding surface with a predetermined curvature, and circularly arranged on the installation wall of the housing; a connector bracket fixed on the installation wall of the housing, on which optical adapters are fixedly mounted; and a lid hinged to the housing for protecting the interior of the housing; whereby optical fiber cables, each connected to a pig tail via a spliced portion, are accommodated in the housing and wound onto the fiber guides to form an excess length, and connected to the adapters by optical connectors.

Preferably, the distribution apparatuses are accommodated in a vertical rack in a multistage manner.

Favorably, a plurality of vertical racks are arranged in a side-by-side manner.

Preferably, a cord turnabout device for guiding the cable is positioned between the respective adjacent fiber trays.

BRIEF DESCRIPTION OF THE DRAWINGS

Other objects and advantages of the present invention will be apparent from the following description of the preferred embodiments with reference to the attached drawings; wherein.

DESCRIPTION OF THE PREFERRED EMBODIMENTS

Figure 1:
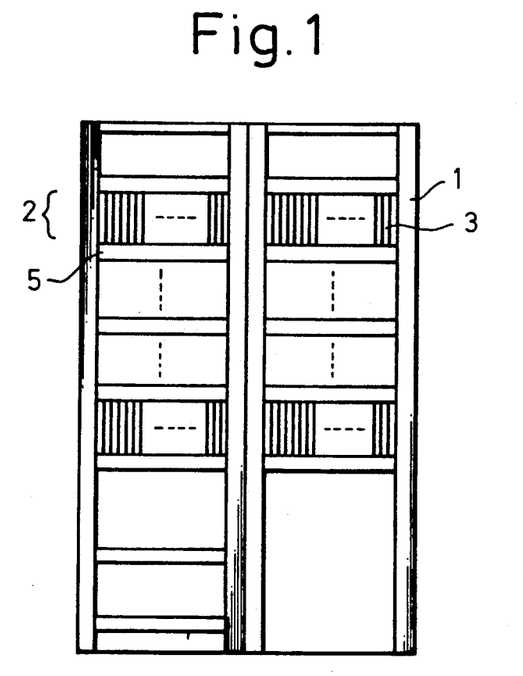
FIG. 1 is a front view of an optical fiber cable distribution apparatus according to the present invention.

In FIG. 1, a plurality of shelves 2 are mounted in a multistage manner on two vertical racks 1 installed adjacent to each other. A plurality of modules 3 for distribution of optical fiber cables (hereinafter referred to as "DF module") are accommodated in the respective shelf 2 parallel to each other. Directly beneath the respective shelf 2 in the rack 1 is positioned a fiber tray 5 for preparing the introduction of first optical fiber cables 4 coming from a first side such as subscriber circuits and second optical fiber cables 4' coming from a second side such as a switch board into the DF modules 3. Alternatively the fiber tray 5 may be positioned above the corresponding shelf 2. The number of racks 1 can be selected in accordance with the size of the fiber optics communication system.

Figure 2:
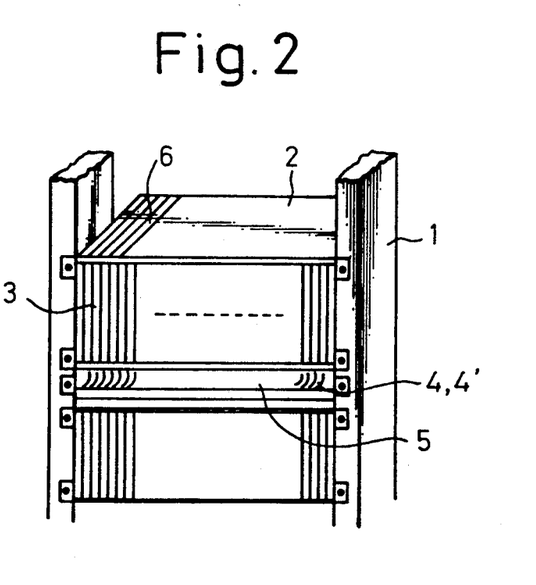
FIG. 2 is a perspective view illustrating a relationship between a shelf and a DF module.

As shown in FIG. 2 in an enlarged scale, the respective DF module 3 is inserted into the interior of the shelf 2 along a pair of rails 6, each provided at a constant pitch on the inner surfaces of the top and bottom walls of the shelf 2, while keeping a vertical position. Optical fiber cables 4 are individually divided and orderly arranged on the fiber tray 5 and connected with the DF modules 3. Structures of the respective parts described above are explained in more detail below.

Shelf

Figure 3:
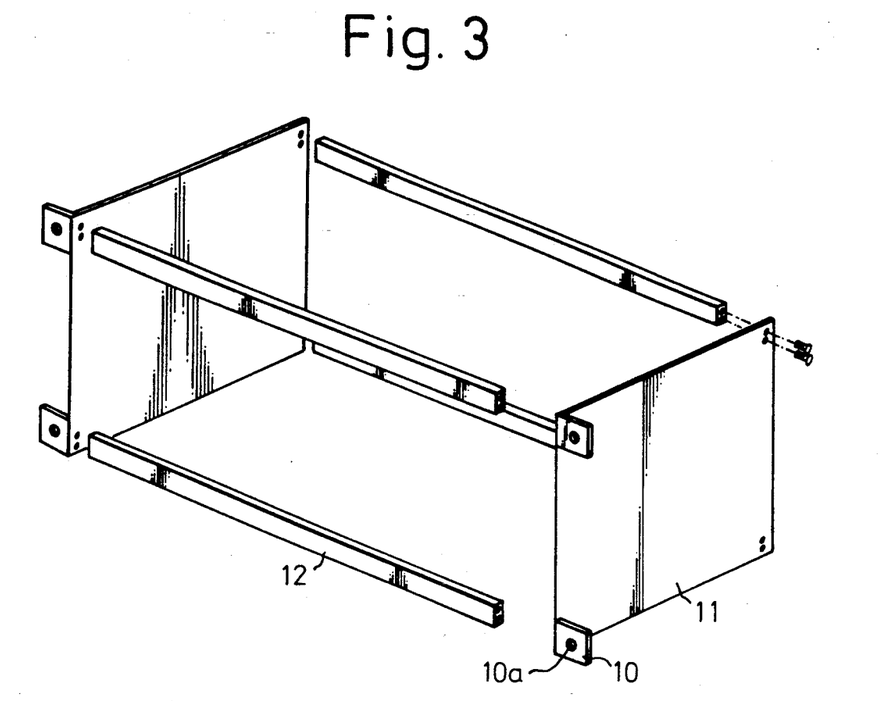
FIG. 3 is an exploded perspective view of the shelf.
Figure 4:
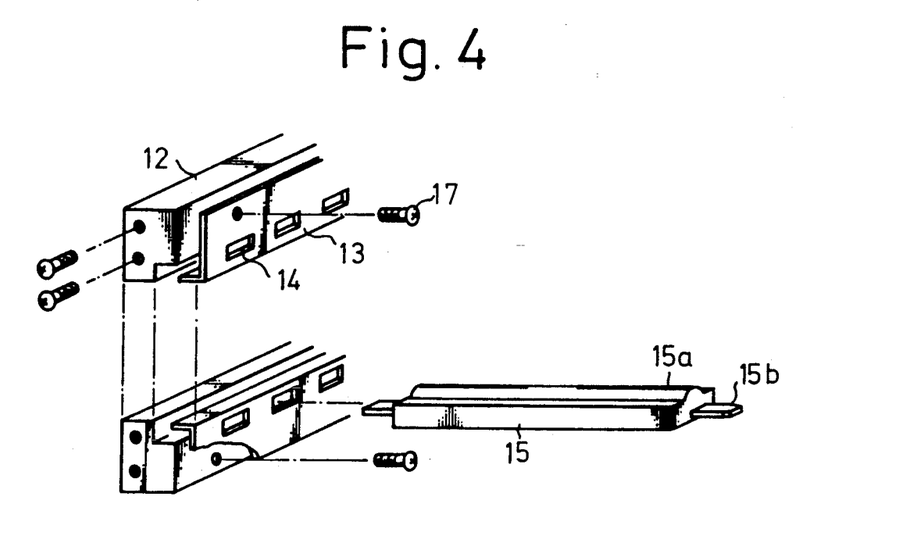
FIG. 4 is an exploded perspective view of an assembly of beam, rail support and rail member.

As shown in FIG. 3, the shelf 2 has a basic structure consisting of a pair of side panels 11, each having extensions 10 at the upper and lower corners at a front edge thereof and four beams 12 connecting the side panels 11 with one another at four corners thereof by screws. The beam 12 is formed of extrusion molded aluminum and has a rectangular cross-section with a shoulder portion. A rail support 13 is fixed on the inner surface of the respective beam 12 by screws 17. The rail support 13 has an L-shaped cross-section and a plurality of slots 14 arranged lengthwise at a pitch.

Figure 5:
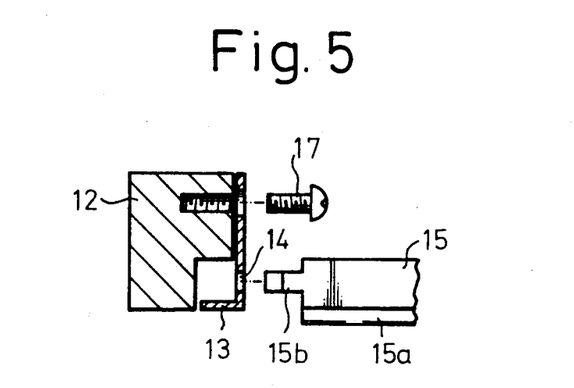
FIG. 5 is a cross-section of the assembly illustrated in FIG. 4.
Figure 6:
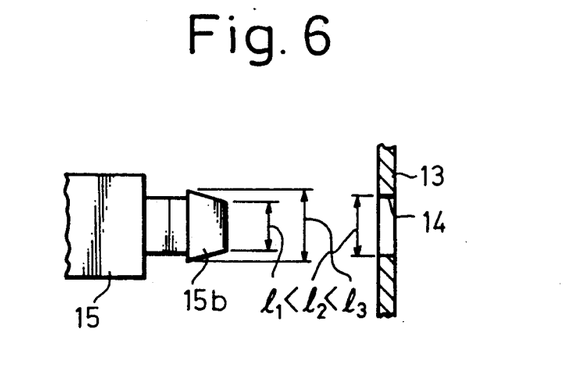
FIG. 6 is a plan view illustrating a dimensional relationship between a projection of the rail member and a slot.

As shown in FIG. 5, a rail member 15 having a cross-section with a semicircular guide portion 15a is bridgingly fixed with the front and rear beams 12 while inserting a projection 15b thereof into the slot 14. As shown in FIG. 6, the projection 15b has a tapered tip with a base portion slightly wider than a width of the slot 14 so that the projection 15b cannot escape from the slot once the elastic deformation of the base portion during engagement with the slot has been recovered.

Figure 7:
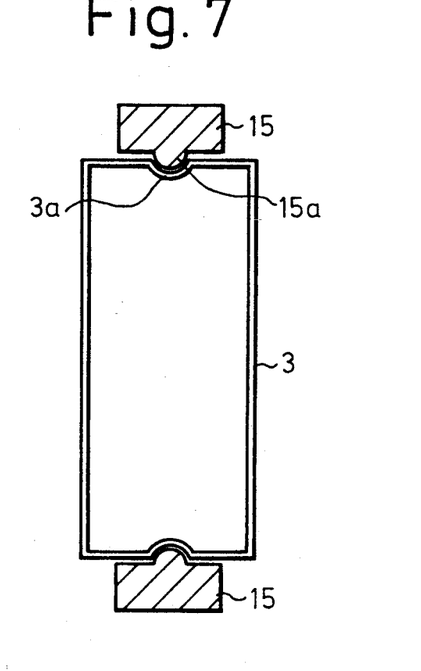
FIG. 7 is a front view of a DF module while engaged with the rail member.

The DF modules 3 are inserted into and drawn out of the shelf 2 along the rail members 15 thus arranged, while engaging grooves 3a formed on the upepr and lower surface of the DF module with the guide portions 15a, as shown in FIG. 7.

Figure 8:
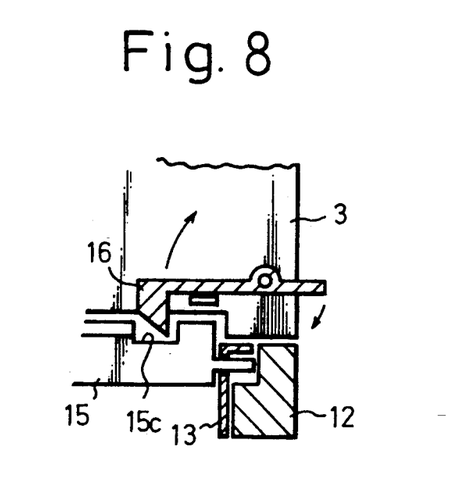
FIG. 8 is a side view of a lock mechanism for the DF module.

To prevent the DF module 3 inserted into the shelf 2 from dropping out by vibration or other, a notch 15c is provided at the front end area of the guide portion 15a, as shown in FIG. 8, which is engageable with a ratchet 16 pivoted at the lower end of the front edge of the DF module 3 when the DF module 3 has been fully inserted into the shelf 2, as shown in FIG. 8.

The shelf 2 is fixed to the rack 1 by screws through apertures 10a on the extension 10 of the side panel.

As is apparent from the drawings, each beam has the same shape and is combined in pair with another beam positioned in reverse phase so that the number of part types can be decreased. This is also applicable to the side panel 12, the rail support 13 and the rail member 15.

Fiber Tray

Figure 9:
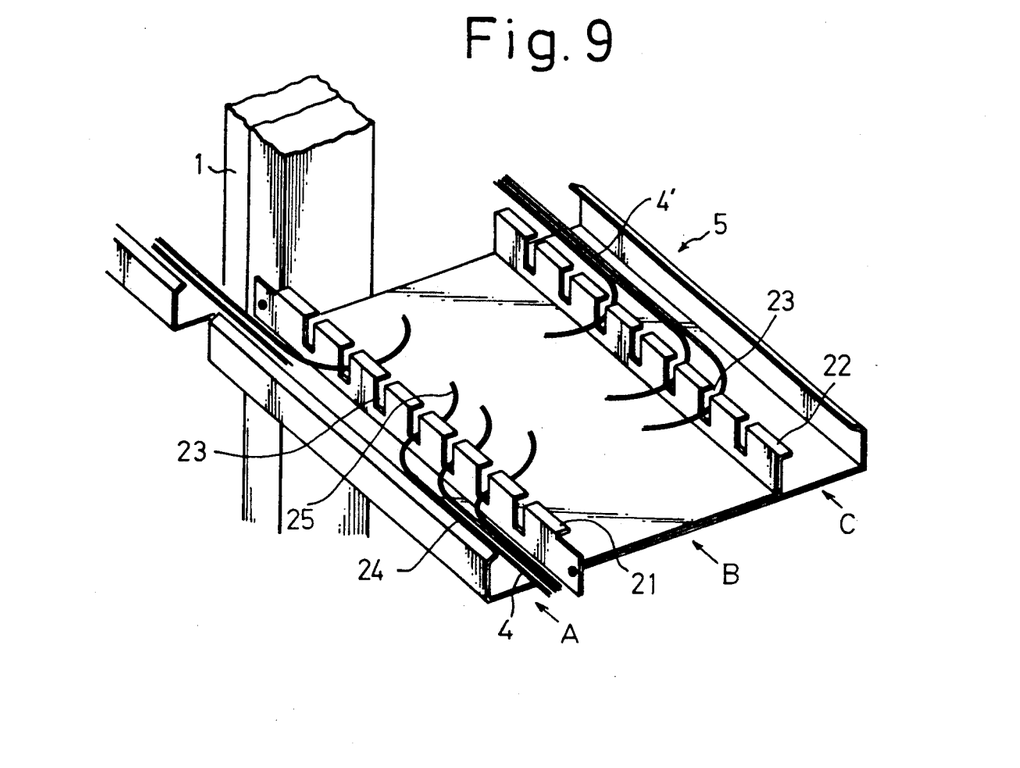
FIG. 9 is a perspective view of a fiber tray.

As shown in FIG. 9, the fiber tray 5 is a shallow U-shaped cross-sectional duct with front and rear edges bending upright from the bottom wall, and has a width substantially the same as the width of the shelf 2. When mounted on the rack 1, the fiber tray 5 is positioned directly beneath or above the corresponding shelf 2 as stated before.

The bottom wall of the fiber tray 5 is divided by two partitions 21 and 22 extending widthwise into three sections; a front section A, a middle section B and a rear section C. The respective partitions 21, 22 have a plurality of slits 23 formed at a pitch.

The front section A is used as a guiding path for outer cables 4 coming from subscriber circuits (first cables) to be introduced into the DF module. The first cables 4 are arranged parallel to each other in the front section A and introduced through the slit 23 into the corresponding DF module 3 accommodated in the shelf 2 positioned above. The rear section C is used as a guiding path for cables 4' coming from an electronics switch board (second cables) to be introduced into the corresponding DF module 3 through the slits 23 in the same manner as the first cables. The middle section B is an area for forming an excess length 25 of the first and second optical fiber cables 4, 4' prior to introduction to the DF module 3.

Figure 10:
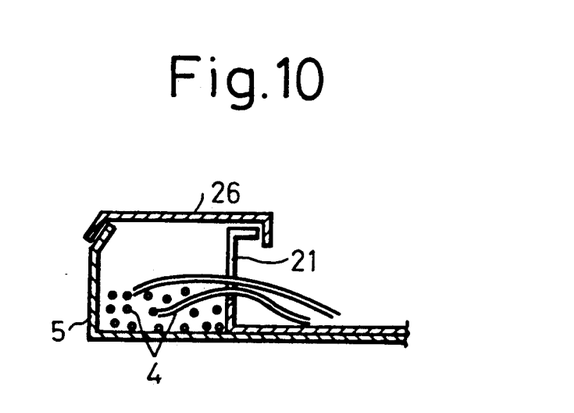
FIG. 10 is a side sectional view of a protection cover for the fiber tray.

These sections A, B and C are carefully finished so that the optical fiber cables are not damaged. In addition, a protection cover 26 is placed on the front and rear sections, as shown on FIG. 10.

Figure 11:
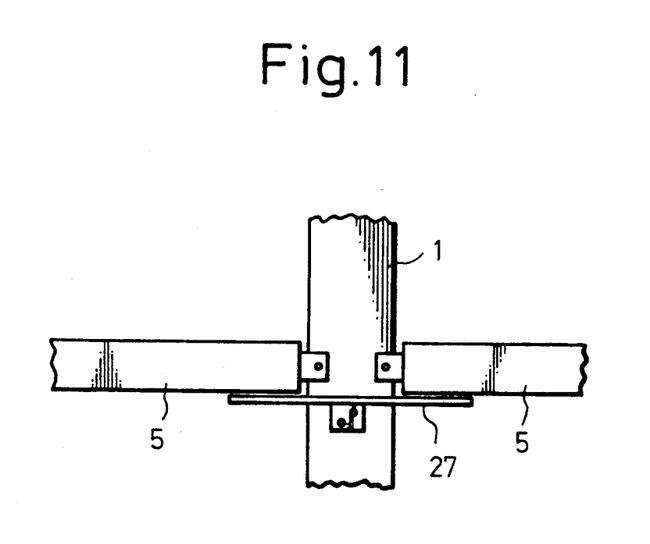
FIG. 11 is a front view illustrating a shield plate.

When a plurality of racks 1 are installed adjacent to each other as described before, a gap is formed, as shown in FIG. 11, between the two adjacent fiber trays 5. To prevent the optical fiber cables from hanging down through this gap causing damage thereof, a shield plate 27 is provided on the bottom walls in the front and rear sections A and C to block the gap.

DF module

Figure 12:
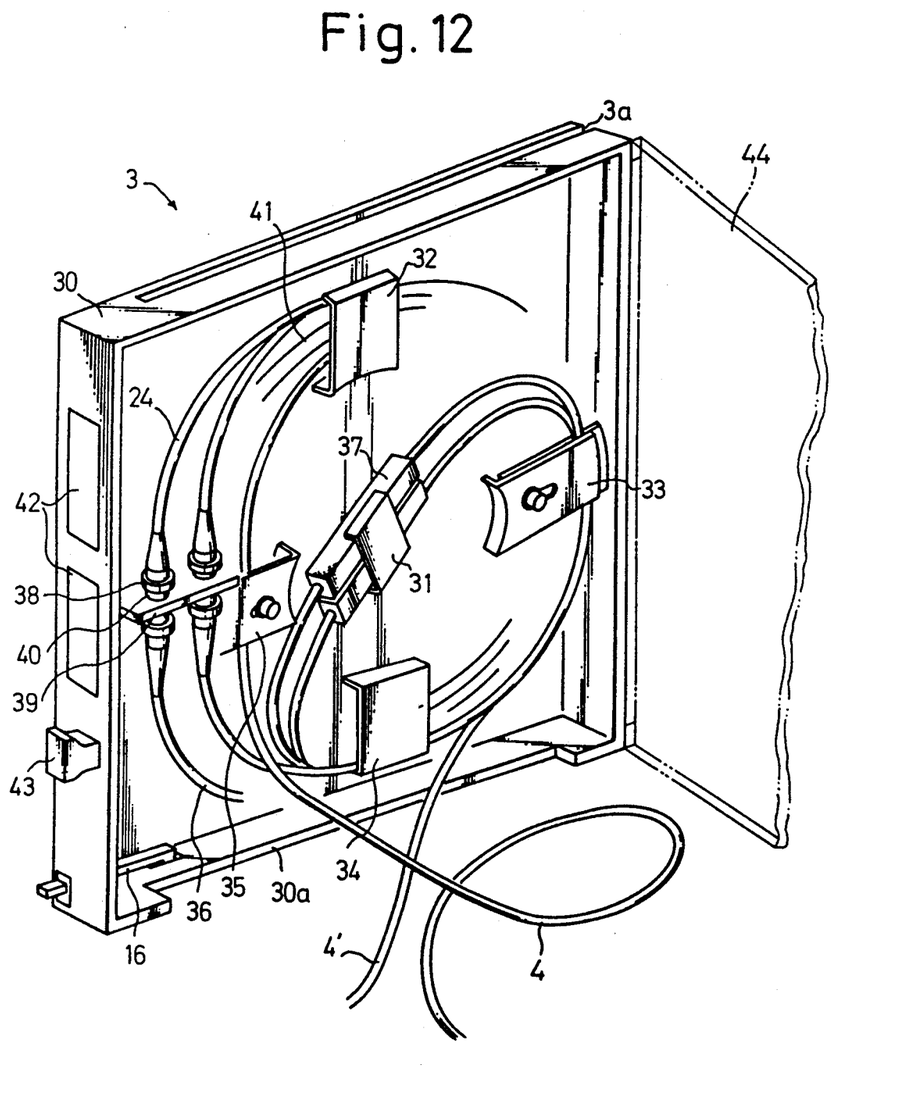
FIG. 12 is a perspective view of a DF module according to the present invention.

FIG. 12 is a perspective view illustrating a structure of the DF module 3. The DF module 3 comprises a relatively thin box-like square housing 30 manufactured by molded plastics and a lid 44 hinged to the housing 30. On the inner wall of the housing 30, which is used as an installation wall, fiber guides 32 through 35 are fixed at positions radially equidistant from the center of the inner wall. The first and second optical fiber cables 4, 4' are introduced into the interior of the housing 30 through an opening 30a formed in the lower wall of the housing and connected with the ends of pigtails 36 by splices 37 gripped by a fiber lock 31 fixed at the center of the inner wall.

Optical connectors 38 secured at a tip end of the pigtail 36 are insertingly engaged with optical adaptors 40 mounted onto a connector bracket 39, whereby the first and second optical fiber cables are connected with each other via a patch cord 24. The cables introduced into the DF module 3 are wound several times around the fiber guides 32 through 35 to form an excess length 41 thereof.

In the front outer surface of the housing 30 is a space 42 for an indicating label such as informations for controlling the circuit, and a knob 43 for drawing the DF module 3 out of the shelf 2.

The bearing surface of the fiber guides 32 through 35 have a curvature defined so that the optical fiber cables are held thereby with a radius of more than 1 inch of the bending curvature.

Cord Turnabout Device

Figure 13:
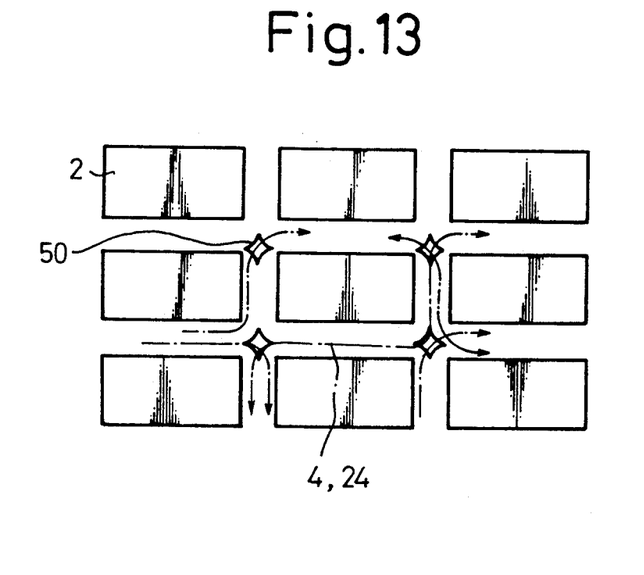
FIG. 13 is a front view of a distribution apparatus according to the present invention, illustrating positions of cord turnabout devices.

In order to guide the first optical fiber cables 4 or patch cords connected thereto to a selected DF module 3 in a selected shelf 2 on a selected rack 1, cord turnabout devices 50 are provided between every adjacent fiber trays 5, as shown in FIG. 13.

Figure 14:
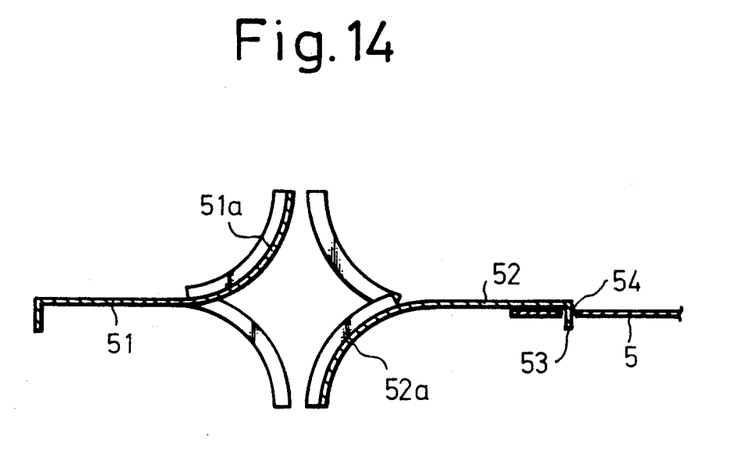
FIG. 14 is a side view of the cord turnabout device.

The cord turnabout device 50 is formed of a pair of plate members 51, 52 arranged on a horizontal plane while opposing an edge of one member 51 to an edge of the other member 52, as shown in FIG. 14. The respective member 51 or 52 is divided into two halves 51a or 52a by a cut having a predetermined length from the opposed edge. The half 51a is bent upward or downward so that the bending directions are reversed not only relative to the adjacent half 51a but also to the opposing half 52b.

Figure 15:
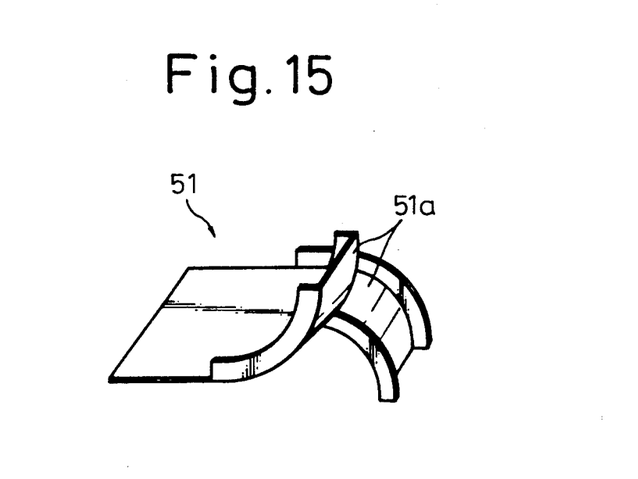
FIG. 15 is a perspective view of part of the cord turnabout device.

The first cable or patch cord is directed to the shelf in which the DF module 3 to be connected therewith is mounted while guided by the bent half 51a or 52. Note the radius of curvature of the halves 51a, 52a must be larger than that of the minimum allowable radius for an optical fiber cable. The cord turnabout device 50 is secured at a position by the engagement of a hook 53 with a corresponding aperture 54 in the fiber tray 5.

As stated above, according to the present invention, i.e., an optical fiber cable distribution apparatus, a shelf in which a plurality of DF modules are vertically accommodated is combined with a fiber tray positioned horizontally above or beneath the shelf to form a unit, thereby enabling a high density mounting of these units on the rack, whereby the floor area necessary for the installation of this apparatus can be decreased by $\frac{1}{3}$ to $\frac{1}{4}$ compared to the conventional one.

In addition, this enables a quick response to the demand for the enlargement of system size. Further, since the first cables coming from the subscriber circuits and the second cables connected to the equipment are completely separated on the fiber tray, an operation for the selection or the changing of circuits becomes easier.

I claim:

1. An optical fiber cable distribution apparatus, comprising:
    a plurality of modules for distribution of optical fiber cables accommodated on a shelf in a vertical position and parallel to each other; and
    a fiber tray, arranged horizontally directly beneath or above the shelf, for the preparation for introducing first optical fiber cables coming from outside of said apparatus and second optical fiber cables connected with an equipment into the modules, a front section of the fiber tray being used as a guiding path for the first optical fiber cables, a rear section of the fiber tray being used as a guiding path for the second optical fiber cables, and a middle section between the front and rear areas being used as an excess length accommodation space for the first and second optical fiber cables to be introduced into the respective modules,
    wherein said shelf and fiber tray are combined with each other to form a unit.

2. A distribution apparatus as defined by claim 1, wherein said shelf comprises:
    a box-like basic structure formed by a pair of side plates and four beams connecting the side plates;
    rail supports extending along and fixed to the respective beams; and
    rail members arranged at a regular pitch while bridging a front beam with a rear beam, along each of which rail member one of the modules is detachably inserted into the shelf.

3. A distribution apparatus as defined by claim 1, wherein said fiber tray is a shallow U-shaped cross sectional duct having front and rear walls bending upright from a bottom wall, the bottom wall being divided into the front section, the middle section and the rear section by two partitions extending parallel to the front and rear walls.

4. A distribution apparatus as defined by claim 1, wherein one of the modules comprises:
    a housing in a flat box-like housing having a mounting wall;
    a series of fiber guides each having a guiding surface with a predetermined curvature, and circularly arranged on the mounting wall of the housing;
    a connector bracket fixed on the mounting wall of the housing on which optical adapters are fixedly mounted; and
    a lid hinged to the housing for protecting the interior of the housing,
    wherein optical fiber cables, each connected to a pig tail via a spliced portion, are accommodated in the housing and wound onto the fiber guides to form an excess length, and connected to the adapters by optical connectors.

5. A system constructed by a plurality of distribution apparatuses defined by claim 1, wherein the distribution apparatuses are accommodated on a vertical rack in a multistage manner.

6. A system as defined by claim 5, wherein a plurality of the vertical racks are arranged in a side-by-side manner.

7. A system as defined by claims 5 or 6, wherein a cord turnabout device for guiding the cable is positioned between the respective adjacent fiber trays.

* * * * *